United States Patent [19]
Chintis

[11] Patent Number: 5,183,499
[45] Date of Patent: Feb. 2, 1993

[54] METHOD OF RECOVERING ELEMENTAL MERCURY FROM SOILS

[75] Inventor: Michael Chintis, Tempe, Ariz.

[73] Assignee: Hunter Mining Company, Silver City, N. Mex.

[21] Appl. No.: 813,851

[22] Filed: Dec. 26, 1991

[51] Int. Cl.$^5$ ............................................. C22B 43/00
[52] U.S. Cl. .................................... 75/742; 405/129; 588/231
[58] Field of Search ................. 75/742; 405/128, 129; 423/DIG. 20

[56] References Cited
FOREIGN PATENT DOCUMENTS
423900 4/1991 European Pat. Off. ............ 405/128

Primary Examiner—Melvyn J. Andrews
Attorney, Agent, or Firm—Robert W. Becker & Associates

[57] ABSTRACT

In a method of recovering elemental mercury from soil, the soil contaminated with elemental mercury is first sized in a screening and pressure-washing step. The fine soil particles which pass through the screening device contain essentially all of the elemental mercury. The screened soil particles are fed in the form of a slurry into a gravitational separator. The resulting soil tailings and discharged and a residue comprising heavy materials and elemental mercury is then fed into a gravitational concentrator for a further separation step. The method allows the recovery of more than 99.5% of elemental mercury.

30 Claims, 2 Drawing Sheets

METHOD OF RECOVERING ELEMENTAL MERCURY FROM SOILS

BACKGROUND OF THE INVENTION

The present invention relates to a method of recovering elemental mercury from soils.

Elemental mercury is used in gold and silver mining operations to extract these precious metals from the ore. It is also extensively used in metering devices and pressure gauges in pump stations throughout the oil and gas industry, especially for gas and oil pipelines. Other applications include thermometers, switches, and rectifier tubes. Although the high toxicity of elemental mercury and other mercury compounds and their detrimental impact on the environment have been known for a long time, and some recovery processes and reclamation programs for mercury/mercury compounds have been investigated and are in use, a satisfactory, simple, and fast method of recovery has not been found.

Among the most common techniques used to date for mercury containing solid wastes are thermal recovery processes, such as retorting and roasting, acid leaching, stabilization of the solid waste, or incineration. The Environmental Protection Agency (EPA) has recommended thermal recovery processes such as retorting and roasting as the preferable methods (best demonstrated available technique—BDAT) for the recovery of elemental mercury from solid wastes (see Rules and Regulations published in the Federal Register, vol. 55, No. 106 (1990)). The greatest disadvantage of thermal processes, besides the relatively high energy expenditures, is the need for air emission control devices. Furthermore, the retorting and roasting facilities are stationary, immobile plants so that the mercury containing wastes or contaminated soils must be removed or excavated and shipped to the thermal processing plants.

It is therefore an object of the present invention to provide a method of removing mercury, especially elemental mercury, from contaminated soils which is highly effective and fast, does not pose any health hazards to the operating personnel and/or the environment, is simple and does not require expensive and elaborate equipment. Preferably, the method should be practicable with mobile and self-supporting equipment in order to be operable in remote areas that do not have access to municipal water and electricity.

BRIEF DESCRIPTION OF THE DRAWINGS

This object, and other objects and advantages of the present invention, will appear more clearly from the following specification in conjunction with the accompanying drawings and tables, in FIG. 1 is a flow chart of the steps of the inventive method showing the various material effluents.

Figure 1:
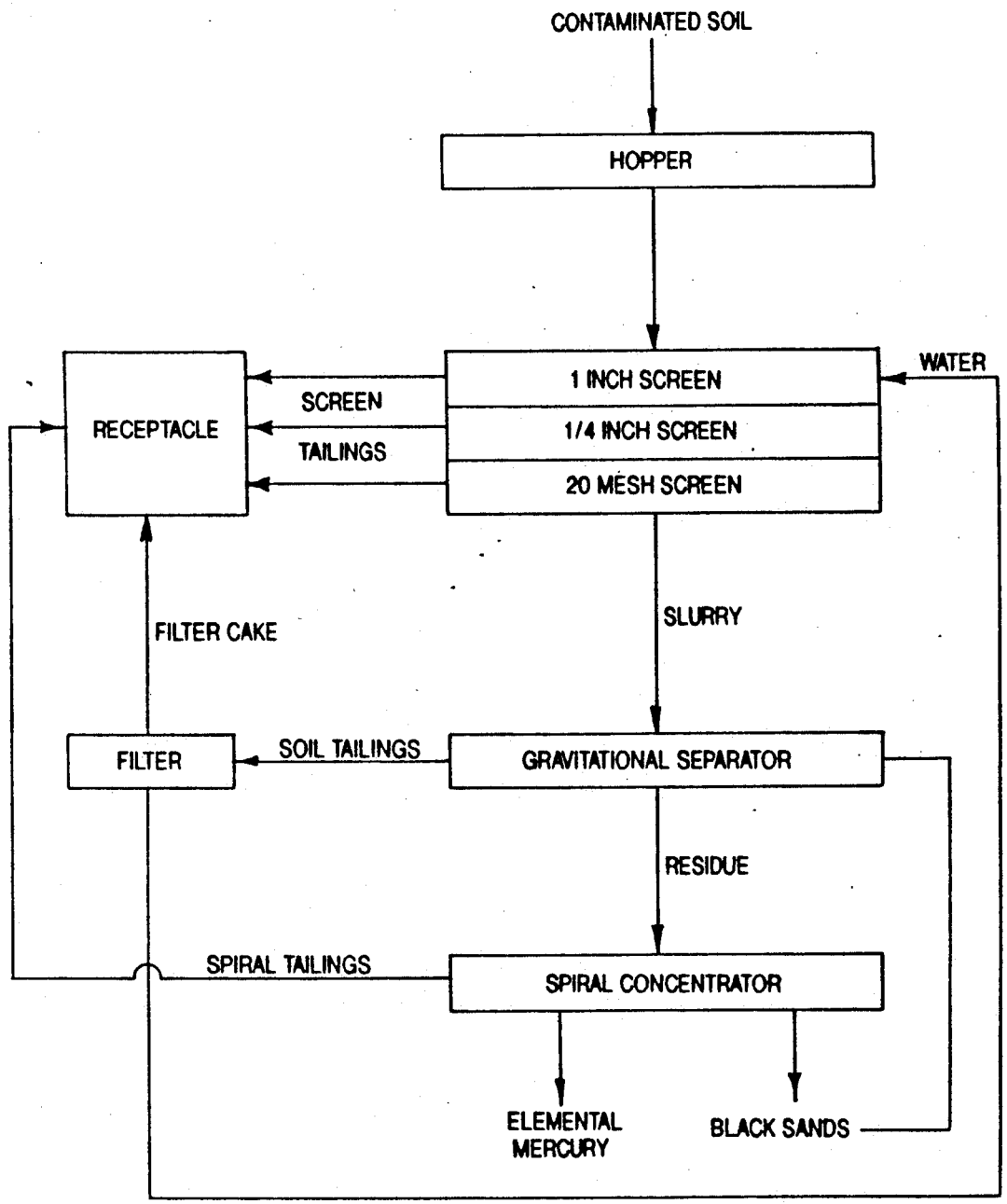

Table 1 shows the elemental mercury distribution in screened soils;

Table 2 contains results on the elemental mercury recovery after a two-step gravitational separation; and Table 3 gives results on the elemental mercury recovery with a spiral concentrator.

SUMMARY OF THE INVENTION

The method of the present invention is primarily characterized by the following steps:
uniformly sizing the elemental mercury containing soil;
feeding the elemental mercury containing soil into at least one gravitational separator;
separating the soil and elemental mercury by gravity;
discharging soil tailings from the gravitational separator;
removing a residue comprising elemental mercury and heavy materials from the gravitational separator; and
with a gravitational concentrator, recovering elemental mercury from the residue by gravity.

The gravitational separators used for the inventive method are known in the mining industry and are commercially available. Such gravitational separators are used in the mining industry for the separation of finest gold particles from tailings and sands. An example of such a machine is the Neffco fine gold recovery system, available from Reno Prospectors Supply, 315 Claremont Street, Reno, Nev.

Centrifugal separators such as the commercially available Knelson bowl and the Tra-Li Concentrator have proved to be unsuitable for the separation of elemental mercury from soils. When using a centrifugal separator, elemental mercury is found throughout the resulting deposits and cannot be properly recovered.

The gravitational concentrator employed in the present invention may be in the form of a so-called spiral concentrator which operates based on the principle of the Archimedes spiral. Essentially, it consists of a plate that is provided with a spiral groove extending from the circumference of the plate to the center. At the center, the spiral ends in a hole extending through the plate which allows materials that have been concentrated in the spiral groove to exit from the concentrator and to be collected in a respective container. During operation, the plate is slowly rotated, for example, at 30 rpm, and is slanted relative to the horizontal direction at selected angles depending on the material to be processed and separated/concentrated.

Gravitational (spiral) concentrators such as the one described above and similar designs are well known in the mining industry and are readily available.

The step of sizing the soil comprises a screening step. Expediently, at least one coarse, at least one medium and at least one fine screen are used for the screening step. The coarse screen has openings of 0.5 by 0.5 inches to 2 by 2 inches, preferably, the openings are 1 by 1 inches. The fine screen has a mesh size of 15 to 25 mesh, preferably, the fine screen has a mesh size of 20 mesh. The medium screen has a mesh size of 1 to 15 mesh and preferably a mesh size of 4.

The arrangement of the screens is expediently such that the coarse screen is arranged upstream of the medium screen and the fine screen is arranged downstream of the medium screen. Preferably, the coarse screen is arranged above the medium screen and the fine screen is arranged below the medium screen. Thereby, a compact design of the screening device is ensured. Preferably, the coarse screen, the medium screen and the fine screen each are provided with a respective discharge chute for removing material retained by the respective screens.

The sizing step further comprises the step of pressure-washing the soil with a liquid preferably water. It is expedient to form a slurry of the soil and the pressure-washing liquid for facilitating the transport of the soil through the separating apparatus.

Furthermore, the pressure-washing step is advantageous in the method of the present invention because the liquid, preferably water, assists in washing off the elemental mercury particles or prills from the soil and conveying the elemental mercury through the screen. Also, the use of a liquid, respectively water, reduces or prevents the vaporization of elemental mercury into the atmosphere. By reducing or eliminating vaporization an important safety feature is provided for protecting the environment and, in particular, the operating personnel performing the inventive method from exposure to elemental mercury.

Accordingly, in the feeding step, the elemental mercury containing soil is preferably fed into the gravitational separator in the form of a slurry formed of the soil and the liquid used for pressure-washing The slurry may contain between 5 and 50% solids, and preferably between 10 and 20 solids, and more preferred 15% solids.

When a slurry is used as the feed stock the soil tailings are accordingly discharged from the gravitational separator in the form of a soil tailings slurry.

It is expedient to further include the step of filtering or settling the soil tailings slurry to recover the liquid used for the pressure-washing step and to discard cleaned soil in the form of a compact filter cake. The liquid may then be recycled to be again used in the pressure-washing step. By recycling the pressure-washing liquid, the method of the present invention may be operated as a closed circuit thus reducing the amount of liquid or water required to perform the method. This is especially desirable for a mobile apparatus designed to practice the inventive method in remote areas without a readily available water supply.

In a further embodiment of the present invention, a step of decanting elemental mercury from the residue of the gravitational separator before performing the step of recovering elemental mercury with the gravitational (spiral) concentrator is suggested. After the step of decanting the elemental mercury, the residue is then subjected to the further recovering step by gravitational force, yielding elemental mercury heavy black sands still containing small amounts of elemental mercury and spiral tailings essentially free of elemental mercury.

The heavy black sands resulting from the gravitational recovery step with the spiral concentrator may be recycled into the gravitational separator in order to further improve the rate of elemental mercury recovery and to reduce the amount of soil which is still contaminated with elemental mercury to an unacceptable level after being subjected to the separation and recovery steps.

It is preferable that the method of the present invention be carried out in a continuous manner, whereby a slurry of elemental mercury contaminated soil is fed into the gravitational separator in a constant flow and the soil tailings in the form of a slurry are constantly discharged, while the residue comprised of elemental mercury and heavy material at the bottom of the gravitational separator is withdrawn in intervals and fed into the spiral concentrator.

In another embodiment of the present invention, two of the gravitational separators are provided and connected in series such that soil tailings from a first gravitational separator are introduced into a second gravitational separator for an additional separation step. With this embodiment the overall separation of elemental mercury may be improved.

When only one gravitational separator is provided the soil tailings may be recycled into the gravitational separator to undergo a second separating step. More elemental mercury may be separated from the soil tailings of the first separation run and the efficiency of the separating step may be improved.

DESCRIPTION OF PREFERRED EMBODIMENTS

The present invention will now be described in detail with the aid of the flow chart of FIG. 1 and the specific embodiment represented in FIG. 2.

The method of the present invention is preferably performed as shown in the following steps outlined in FIG. 1.

Soil contaminated with elemental mercury is introduced into a hopper and transported onto the screening device which comprises a 1 inch coarse screen, a ¼ inch medium screen, and a 20 mesh fine screen. Water is supplied to the screening device to break up the soil, to prevent vaporization, to wash off elemental mercury prills and to form a slurry with the soil. The screen tailings contain less than 1.5 ppm elemental mercury and are discarded into a receptacle for cleaned soils. The soil passing through the 20 mesh screen contains essentially the entire amount of elemental mercury present and is then conveyed in the form of a slurry into a gravitational separator. The soil tailings from the gravitational separator are introduced into a filtering unit to separate the water from the soil tailings. The water is recycled to the screening device, and the filter cake is transferred to the receptacle for cleaned soils (average elemental mercury contents of the soil tailings 1-10 ppm). The residue at the bottom of the gravitational separator is subsequently treated with a spiral concentrator to recover elemental mercury. The spiral tailings usually contain less than 20 ppm elemental mercury. Small amounts of heavy black sands that ar collected together with the elemental mercury contain up to 1% of elemental mercury and are recycled to the gravitational separator.

Figure 2:
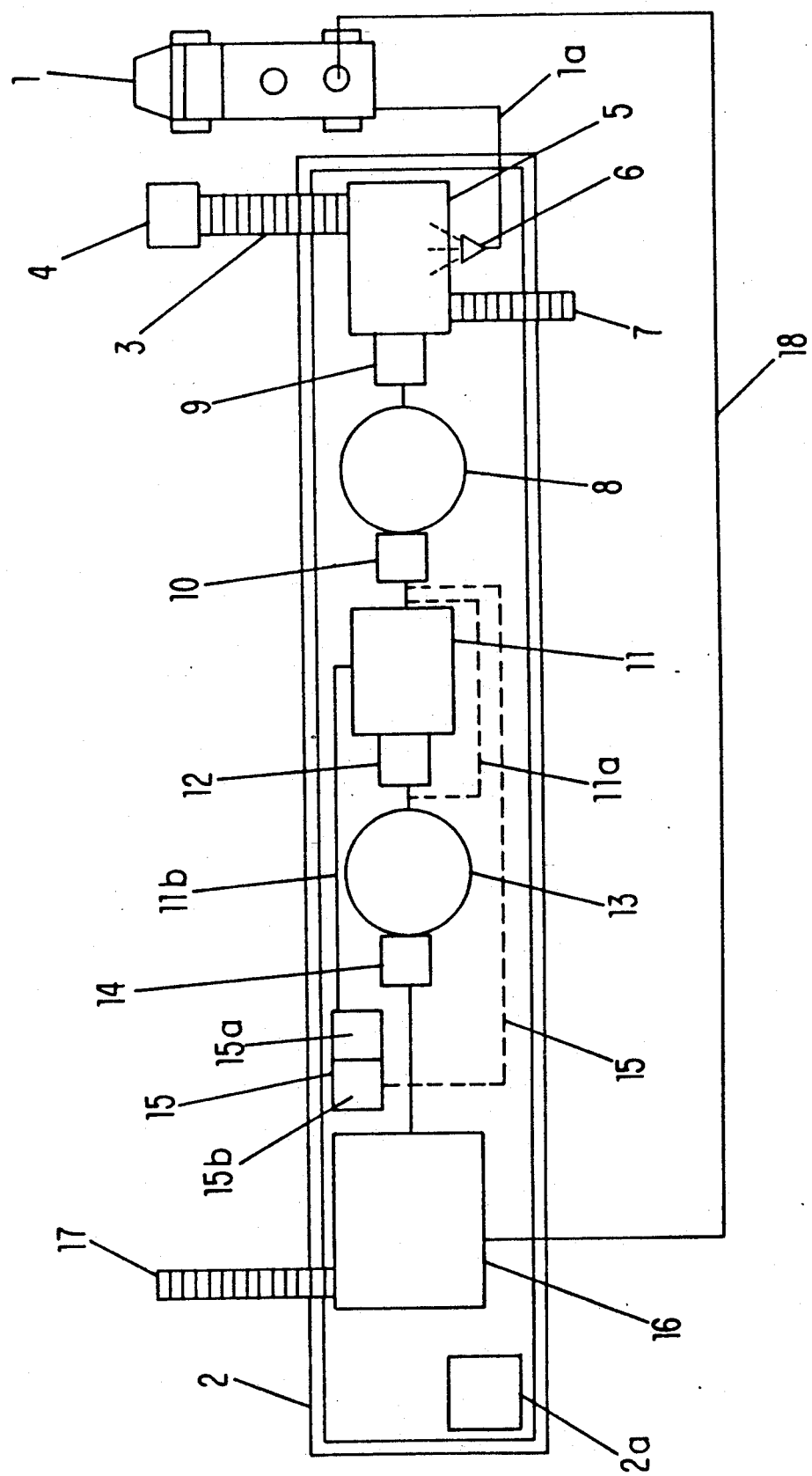
FIG. 2 is a schematic representation of a preferred embodiment of an apparatus for practicing the method of the present invention.

The method of the present invention is preferably performed with an apparatus as shown in the FIG. 2, representing a mobile unit to be transported to a contaminated site, especially a remote site with no access to municipal water and electricity. The mobile unit therefore comprises a tank truck 1 having preferably a gasoline driven pump unit for supplying the liquid (water) needed for the pressure washing step via the conduit 1a to the screening device 5.

The mobile unit is preferably mounted on a trailer bed 2. It comprises an independent power unit 2a such as a Diesel generator or similar means for supplying electricity The mobile unit further comprises a belt feeding device 3 with a hopper 4 for feeding the contaminated soil to the screening device 5. The screening device 5 may be in the form of a vibrating triple screen having a coarse, a medium and a fine screen. The coarse screen preferably has openings of 1 by 1 inches, the medium screen expediently is provided with openings of ¼ by ¼ inches (4 mesh), while the fine screen preferably is a 20 mesh screen.

The screening device 5 is further provided with spray nozzles 6 (only one of which is schematically represented in FIG. 2) for supplying a pressurized liquid, preferably water, to the material to be screened The pressurized water assists in breaking up the soil and washing off soil particles together with elemental mercury prills from rocks and stones. Rejected soil, rocks and stones are removed from the screen by respective chutes 7 (only one is represented in FIG. 2).

The soil which passes through the screening device 5 forms a slurry with the pressure-washing liquid. The slurry is fed into a container 8 by a sand pump 9 where it is agitated in order to prevent settling of the soil particles of the slurry. From here the slurry is fed into the gravitational separator 11 via a further sand pump 10. The gravitational separator 11 is preferably a Neffco fine gold recovery unit (Neffco unit).

The Neffco unit is comprised of a rotating bowl that is enclosed in a housing. It essentially functions on a combination of gravitational and small centrifugal forces. The Neffco unit may be operated as an open container whereby the material to be separated is introduced at the bottom of the rotating bowl in a continuous stream and the light-weight soil tailings simply overflow the edges of the rotating bowl and are collected in a receptacle beneath the Neffco unit. However, it is preferable to provide the unit with a top closure having an inlet extending to the bottom of the bowl and an outlet for discharging the light-weight soil tailings to be discarded so that a closed system is provided and any losses of material are prevented. The inner wall of the bowl is provided with an Archimedes-type spiral in which the heavy particles are caught and transported to the bottom of the rotating bowl. The rotating bowl is usually rotated at approximately 60 rpm.

When material is fed into the rotating bowl of the Neffco unit the heavy material will settle in the spiral of the inner wall due to the centrifugal and gravitational forces while the lighter soil tailings are carried away in an upward direction with the constant flow of soil being fed into the rotating bowl in the form of a slurry. To ensure a most efficient separation, the slurry is fed into the bottom of the bowl so that the slurry must travel the distance between the bottom and the outlet at the top of the bowl thereby providing enough time for an effective separation.

To further increase the effectiveness of the separation step in the gravitational separator 11 the soil tailings slurry that exits the gravitational separator via the sand pump 12 may be recycled into the gravitational separator 11 via the line 11a represented as a dash-dotted line in FIG. 2.

Downstream of the separator, a further container 13 is provided for collecting and agitating the soil tailings slurry. Via another sand pump 14, the soil tailings slurry is then pumped into a filter or thickening unit 16 where the soil tailings slurry from the gravitational separator is filtered or settled. The filtered liquid or water is recycled via the conduit 18 to the truck 1 and used for further pressure-washing during the screening and sizing step. The filter cakes or sediments of essentially cleaned soil tailings are removed via a chute 17 and placed into a receptacle (not represented in the drawing).

The residue in the separator 11 which is comprised of elemental mercury and heavy materials is removed from the bottom and is fed via the line 11b into the gravitational concentrator 15 in the form of a spiral concentrator to further separate elemental mercury from the heavy materials. Prior to the separating step with the spiral concentrator 15, elemental mercury may be removed from the residue by decanting. With the spiral concentrator 15 elemental mercury is recovered from the residue in a respective collecting vessel 15b, in which also heavy black sands will accumulate. The spiral tailings of a low elemental mercury content are discharged into a respective receptacle 15a. The heavy black sands, left behind after the elemental mercury has been removed by decanting, may be recycled via a line 15c into the gravitational separator 11. It is also possible to recycle the spiral tailings into the gravitational separator in order to improve the recovery rate for elemental mercury.

In order to improve and speed up the separation process further it is possible to provide two separators in series so that the discharged slurry of the first separator is subjected to a further separation in a second separator. The two separators may be directly connected to one another or another container may be interposed for agitating the soil tailings exiting the first separator. With two gravitational separators the feed rate for the slurry may be increased so that the throughput of the apparatus is accelerated. The combined residues may then be subjected to the gravitational recovering step carried out with the spiral concentrator.

Instead of providing a second separator, it is possible to simply recycle the discharged soil tailings into the separator for a second separation step. This is schematically shown by the dash-dotted line 11a in the drawing.

In the following paragraphs the individual steps of the inventive method will be described in further detail, and the effectiveness of the inventive method will be demonstrated with specific examples.

The sizing process is carried out such that the contaminated soils are filled into the hopper 4 and conveyed via the belt feeding device 3 to the coarse top screen of the vibrating screening device 5. The screening process is supported by a pressure washing step, whereby a liquid, preferably water, is ejected under pressure from spray nozzles 6 to break up larger soil particles and wash off elemental mercury prills which then fall through the screens. Accordingly, the sizing and screening step removes large constituents of the contaminated soil such as rocks and stones and only the finely divided soil particles which carry the elemental mercury with them will pass through the screens. With these measures, the amount of soil which must be further processed by the inventive method steps is substantially reduced. It is also ensured that all the elemental mercury will pass through the finest mesh screen and that the rejected material is free of elemental mercury. Furthermore, the volatilization and vaporization of elemental mercury is suppressed by supplying water during the screening step.

Due to the vibrations of the screen the soil particles which are fine enough to pass through the respective screen will fall onto the screen below, while the coarser particles are removed from the respective screen via a coordinated discharge chute. The fine screen at the bottom of the screening device allows only soil particles of the desired size, suitable for the inventive method, to pass.

The feed rate of the water is adjusted to the amount of soil particles passing through the 20 mesh screen in order to produce a slurry that contains approximately 10–20% of soil solids, preferably 15%.

It has been demonstrated that a 20 mesh screen is most suitable for the inventive method. Analyses of the rejected soil particles of a size larger than 20 mesh (+20 mesh) have shown that these particles are substantially free of elemental mercury.

In a representative experiment, 227 g of elemental mercury were added in tiny prills to 22,700 g of soil, which had not been screened with a ¼ inch (4 mesh) screen, and intensively intermixed. Subsequently, the elemental mercury containing soil was pressure-washed and screened with a ¼ inch screen and a 20 mesh screen. The 174 inch soil and the +20 mesh soil fractions (i.e., the fractions rejected by the screen) were dried and crushed, and analyzed for their mercury content. The pressure-washing water was also analyzed for mercury. The soil which passed through the set of screens was then subjected to a separation process with the spiral concentrator and the amount of recovered elemental mercury was determined. The heavy black sands and the spiral tailings were analyzed for mercury after drying. The results are shown in Table 1.

TABLE 1

Mercury Distribution in Screened Soils

| Material Fractions | Mercury |
|---|---|
| +¼ inch soil<br>3511.7 g; 1.1 ppm Hg | 0.0039 g = 0.0017% |
| +20 mesh soil<br>6446.1 g; 0.71 ppm Hg | 0.0046 g = 0.002% |
| elemental mercury | 225.8 g = 99.67% |
| heavy black sands<br>102.3 g; 4540 ppm Hg | 0.4640 g = 0.2% |
| spiral tailings<br>12639.9 g; 21 ppm Hg | 0.2654 g = 0.1% |
| wash water | no mercury detected |
| | 99.9737% |

It can be seen from the test results that the +¼ soil fraction and the °20 mesh soil fraction contain only minute amounts of elemental mercury. Essentially the entire amount of elemental mercury that was added to the soil passed through the screens. Accordingly, an effective pre-separation step has been developed which eliminates a large quantity of soil from having to undergo the entire sequence of removal steps of the inventive method. In the above example, the +¼ inch soil fraction and the +20 mesh soil fraction correspond to 15.5% and 28.4% of the contaminated soil, respectively. Thus, 44% of the soil to be treated could be discharged without performing the subsequent gravitational separation steps.

The sample soils to be treated according to the inventive method were prepared as follows:

Dry soils were first screened with a medium screen having openings of a size of ¼ by ¼ inch. The soil portions that passed through the medium screen were then subjected to a further screening step with a fine screen of a mesh size of 20.

To the resulting dry soils of a −20 mesh size (i.e., soil that passed through the 20 mesh screen), elemental mercury was added with an eyedropper such that the entire surface area of the soil was uniformly spotted. The soil and the elemental mercury were then intimately mixed to ensure an even, very fine distribution (flouring) of the elemental mercury in the soil. The amount of elemental mercury used was 1% of the total weight of the soil of a −20 mesh size contaminated with elemental mercury.

The total mercury contents of the soils, treated with the inventive method, were determined by the analytical procedure outlined in EPA Method 7471. In order to increase the representativeness of the method, the sample size analyzed was increased to 10 g from 0.2 g as prescribed by EPA standards. Thereby, misleading and incorrect results due to uneven distributions of the contaminants in the soils could be eliminated to a great extent.

The following experiments were carried out with the Neffco fine gold recovery unit. Only one machine, i.e., gravitational separator, was used and the cleaned soils were not recycled into the system.

100 pounds (45,400 g) of soil contaminated with elemental mercury (454 g) according to the method described above were fed over a time period in the form of a slurry of 15% solids. The Neffco machine was rotated at a speed of 60rpm. The soil tailings slurry (Neffco tailings) was simply allowed to overflow the edges of the bowl and collected in a container. The soil tailings slurry was sampled every three minutes to monitor the mercury content. The residue that remained in the Neffco machine after completion of the run was further treated by feeding it into a spiral concentrator (24 inches in diameter). The spiral concentrator was operated at 30 rpm and at a slant of 75° relative to the horizontal. During the run water was sprayed on the concentrator to allow the spiral tailings to overflow the plate. The overflowing tailings were collected in a container. Elemental mercury and a small amount of heavy black sands collected in the spiral groove and advanced therein to the center hole through which they exited the plate and accumulated in a respective collecting vessel. The elemental mercury was decanted from the blacks sands which constitute only a small amount of the material that was separated by the spiral concentrator The results for the staged separation process are shown in Table 2.

With a simple two-step gravitational process combining a gravitational separator of the Neffco type and a spiral concentrator, 99.42% of the elemental mercury added to the soil could be recovered. The amount of elemental mercury contained in the Neffco tailings and the spiral tailings is minimal (5.5 ppm and 18.6 ppm). The heavy black sands contain a larger amount of elemental mercury, but their volume and weight are very small.

TABLE 2

Mercury Recovery, Two-step Separation

| | Mercury |
|---|---|
| recovered elemental mercury | 451.4 g = 99.42% |
| heavy black sands<br>234.1 g; 0.86% Hg | 2.013 g = 0.44% |
| spiral tailings<br>1,883.0 g; 18.6 ppm Hg | 0.035 g = 0.008% |
| Neffco tailings (weight calculated)<br>42,831 g; 5.5 ppm Hg | 0.235 g = 0.052% |

By recycling the heavy black sands into the gravitational separator more elemental mercury would be extracted. Furthermore, as suggested above, two gravitational separators may be combined in series, or the soil tailings may be recycled through the only gravitational separator. With both measures a further increase in the efficiency of the separation is to be expected To demonstrate the efficiency of the spiral concentrator a further test was run in which 13,750 g of soil contaminated with 137.5 g of elemental mercury (according to the method described above) were subjected to a separation run on the 24 inch spiral separator in the manner described above. elemental mercury and heavy black sands were collected at the end of the spiral in the respective vessel. The spiral tailings were collected as washed off by the water sprays. See Table 3 for recovered elemental mercury.

TABLE 3

Mercury Recovery, Spiral Concentrator

|  | Mercury |
| --- | --- |
| recovered elemental mercury | 137.3 g = 99.85% |
| heavy black sands | 0.056 g = 0.04% |
| 0.796 g, 7.11% Hg | |
| spiral tailings | mercury level 2.3-2.5 ppm |

Although the spiral concentrator is a very effective separating device for elemental mercury, as demonstrated above, it is not suited to handle large volumes of contaminated material. Therefore, the gravitational separating step using the rotating bowls is essential in treating large quantities of contaminated soils. It is further an essential step in the present inventive method to provide a pre-separation in which large amounts of soil may already be discharged in an essentially cleaned form without having to undergo further gravitational separation steps of the inventive method. Thus, the inventive combination of steps allows the treatment of large quantities of soil in an efficient and fast method. The mercury recovery data show the high effectiveness of the method.

At present, EPA regulations classify mercury contaminated solid wastes as belonging to the high mercury subcategory when the mercury content is above 260 ppm. According to EPA guidelines, material below 260 ppm may be deposited in landfills if the leachate according to TCLP (toxicity characteristics leachate procedure) standards is less than 0.02 mg/l. However, the respective environmental standards vary from state to state, and further treatment of the soils that have been treated with the inventive method depends entirely on regulatory specifications applicable at the respective treatment site. As shown above, the soil treated according to the present invention has a total mercury level of less than 20 ppm and could thus qualify in most cases for landfill deposition.

With the inventive gravitational separating method, as with any other recovery method, a 100% recovery is essentially impossible. The remaining mercury in the soil must be removed by other processes or immobilized by other known methods (as suggested by the EPA) in order to comply with environmental regulations imposed by state or federal agencies.

It is desirable to remove the entire mercury contents from the soils i.e.. oxides and other mercury salts or compounds should ideally also be removed. The specific gravity of most inorganic mercury compounds is between 6 and 11 so that a gravitational separation from the lighter soils should be possible. In the final gravitational separation on the spiral concentrator it would seem possible to also separate other inorganic mercury compounds from the soil due to the comparatively greater specific gravity by properly adjusting the rotation speed of the spiral concentrator and the slant at which it is operated.

Of course, it is also conceivable to use the method of the present invention for the recovery of other metals or metal compounds having a respectively high specific gravity. It is desirable that the targeted compounds have a specific gravity of greater than 9 to ensure an effective separation process. However, modifications to the method are possible which allow its application for the recovery of materials of a lesser specific gravity. These modifications may include: reducing the throughput rate of the gravitational separator; employing a plurality of gravitational separators in series; recycling soil tailings and/or spiral tailings; using more than one spiral concentrator in series; or other suitable measures within the scope of the invention. With respective adjustments, the inventive method may in particular be useful for the separation of lead or lead compounds which are also hazardous materials posing a threat to the environment.

The method of the present invention provides an effective and inexpensive method of recovering elemental mercury and mercury compounds from soils which is fast, reliable and may be practiced on-site thereby eliminating expensive shipping of material to treatment plants. No thermal recovery steps are required so that cost-intensive air emission control devices are obsolete, and, in general, operation costs are low. The present invention is, of course, in no way restricted to the specific disclosure of the specification, examples and drawings, but also encompasses any modifications within the scope of the appended claims.

What I claim is:

1. A method of removing elemental mercury from soil, comprising the steps of:
   uniformly sizing the soil containing elemental mercury;
   feeding the elemental mercury containing soil into at least one gravitational separator;
   separating the soil and elemental mercury by gravity into soil tailings and a residue, said residue comprising elemental mercury and heavy materials;
   discharging said soil tailings from said gravitational separator;
   removing said residue from said gravitational separator; and
   with a gravitational concentrator, recovering elemental mercury from said residue by gravitation.

2. A method according to claim 1, wherein said sizing step comprises the step of screening of the soil.

3. A method according to claim 2, wherein at least one coarse, at least one medium and at least one fine screen are used for said screening step.

4. A method according to claim 3, wherein said coarse screen has openings of 0.5 by 0.5 inches to 2 by 2 inches.

5. A method according to claim 4, wherein said openings are approximately 1 by 1 inches.

6. A method according to claim 3, wherein said fine screen has a mesh size of 15 to 25 mesh.

7. A method according to claim 6, wherein said fine screen has a mesh size of 20 mesh.

8. A method according to claim 3, wherein said medium screen has a mesh size of 1 to 15 mesh.

9. A method according to claim 8, wherein said medium screen has a mesh size of approximately 4.

10. A method according to claim 3, wherein said coarse screen is arranged upstream of said medium screen and said fine screen is arranged downstream of said medium screen.

11. A method according to claim 3, wherein said coarse screen, said medium screen and said fine screen each are provided with a respective discharge chute for removing portions of the elemental mercury containing soil retained by said coarse screen, said medium screen and said fine screen.

12. A method according to claim 2, wherein said sizing step further comprises the step of pressure washing the elemental mercury containing soil with a liquid.

13. A method according to claim 12, wherein said liquid is water.

14. A method according to claim 12, further comprising the step of forming a slurry of the elemental mercury containing soil and the liquid.

15. A method according to claim 14, wherein, in said feeding step, the elemental mercury containing soil is fed into said gravitational separator in the form of said slurry.

16. A method according to claim 14 wherein said slurry contains between 5 and 50% solids.

17. A method according to claim 16, wherein said slurry contains between 10 and 20% solids.

18. A method according to claim 17, wherein slurry contains approximately 15% solids.

19. A method according to claim 15, wherein said soil tailings are discharged from said gravitational separator in the form of a soil tailings slurry.

20. A method according to claim 19, further comprising the step of filtering said soil tailings slurry to recover said liquid used for said pressure-washing step and to discard cleaned soil in the form of a filter cake.

21. A method according to claim 20, further comprising the step of recycling said liquid for use in said pressure-washing step.

22. A method according to claim 19, further comprising the step of thickening said soil tailings slurry to recover said liquid used for said pressure-washing step and to discard cleaned soil in the form of a sediment.

23. A method according to claim 22, further comprising the step of recycling said liquid for use in said pressure-washing step.

24. A method according to claim 1, further comprising the step of decanting elemental mercury from said residue before said step of recovering elemental mercury by gravity.

25. A method according to claim 1, wherein said gravitational concentrator is a spiral concentrator.

26. A method according to claim 1, further comprising the step of recycling heavy black sands, resulting from said step of recovering elemental mercury, into said gravitational separator.

27. A method according to claim 1, wherein said method is carried out in a continuous manner.

28. A method according to claim 1, wherein two of said gravitational separators are provided and connected in series such that soil tailings from a first one of said gravitational separators are introduced into a second one of said gravitational separators.

29. A method according to claim 1, further comprising the step of recycling said soil tailings to said gravitational separator.

30. A method according to claim 1, further comprising the step of recycling spiral tailings, resulting from said step of recovering elemental mercury, into said gravitational separator.

* * * * *